(12) United States Patent
Rosset et al.

(10) Patent No.: US 6,377,670 B1
(45) Date of Patent: Apr. 23, 2002

(54) METHOD AND SYSTEM FOR ENSURING THE SECURITY OF THE SUPPLY OF SERVICES OF TELECOMMUNICATION OPERATORS

(75) Inventors: Franck Rosset, Paris; Alain Gayet, Courbevoie; Jean Moulin, Draveil, all of (FR)

(73) Assignee: Fintel S.A., Paris (FR)

( * ) Notice: Subject to any disclaimer, the term of this patent is extended or adjusted under 35 U.S.C. 154(b) by 0 days.

(21) Appl. No.: 09/269,045

(22) PCT Filed: Sep. 25, 1997

(86) PCT No.: PCT/FR97/01683

§ 371 Date: May 3, 1999

§ 102(e) Date: May 3, 1999

(87) PCT Pub. No.: WO98/13990

PCT Pub. Date: Apr. 2, 1998

(30) Foreign Application Priority Data

Sep. 25, 1996 (FR) ............................................. 96 11914

(51) Int. Cl.[7] ....................... H04M 11/00; H04M 15/00; H04M 17/00
(52) U.S. Cl. ............... 379/144.05; 379/91.01; 379/93.03; 379/114.01; 379/114.17; 379/144.06
(58) Field of Search .......................... 379/91.01, 91.02, 379/93.02, 93.03, 93.04, 93.05, 93.08, 93.15, 93.37, 144.01, 144.05, 355, 356, 357, 114.01, 114.14, 114.17, 114.2, 144.06; 380/23, 25, 28; 340/825.34, 825.31, 825.32, 825.33; 235/379, 380, 382

(56) References Cited

U.S. PATENT DOCUMENTS 4,707,592 A 11/1987 Ware .......................... 235/379
4,928,098 A 5/1990 Dannhaeuser .......... 340/825.56

(List continued on next page.)

FOREIGN PATENT DOCUMENTS

| CA | 2 085 775 | 6/1994 | ............ H04M/1/27 |
| DE | 43 25 459 | 2/1995 | ............. H04L/9/32 |

(List continued on next page.)

OTHER PUBLICATIONS

Chung, Edward C. and Celenk, M., 'Implementation of a Fax Distribution System in the Local Area Networks of PCs', (periodical unknown), (1992), pp. 964–968.

(List continued on next page.)

*Primary Examiner*—Binh Tieu
(74) *Attorney, Agent, or Firm*—Merchant-Gould PC

(57) ABSTRACT

The invention concerns a method and a system enabling a telecommunication operator (12) to identify rapidly and to debit in complete security the accounts of subscribers of a telephone network. The method comprises the following steps: the telecommunication operator (12) provides each of its subscribers (11) with a subscriber card (10), formatted like a credit card, personalised by specific identifiers for each subscriber and for each subscriber card; said card (10), formatted like a credit card, personalised by specific identifiers for each subscriber and for each subscriber card; said card (10), formatted like a credit card, emits brief identifying sound signals, of the DTMF type, at least partly encrypted, varying with each operation, when it is actuated (14) by the customer (11); the sound signals are received by the microphone (17) of the handset (16) and are converted into electric signals, before being transmitted by the communication network (15) to the computer service (18) of the telecommunication operator (12); the transmitted signals are electronically processed and decrypted (24) by the computer service (18) of the telecommunication operator (12) and the data obtained after processing are compared (25) to the identification data of the subscriber and the subscriber card in the possession of the computer service (18) of the telecommunication operator.

8 Claims, 2 Drawing Sheets

U.S. PATENT DOCUMENTS

Figure 1:
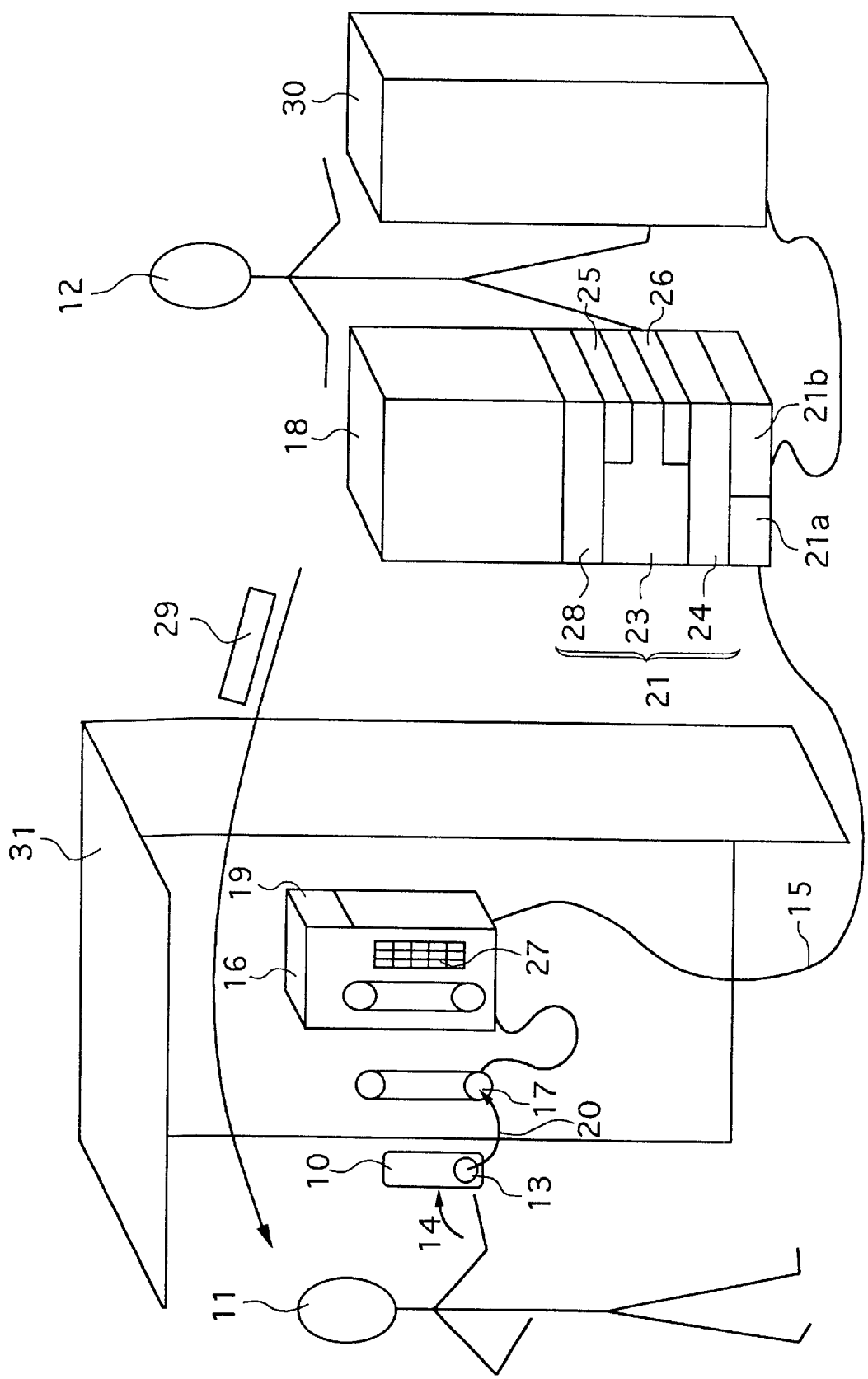

| | | | |
|---|---|---|---|
| 4,998,279 A | | 3/1991 | Weiss .......................... 380/23 |
| 5,136,632 A | * | 8/1992 | Bernard ....................... 379/91 |
| 5,406,619 A | * | 4/1995 | Akhteruzzaman et al. ....................... 379/93.02 |
| 5,787,154 A | * | 7/1998 | Harra et al. .............. 379/93.03 |
| 5,790,644 A | * | 8/1998 | Kikinis ....................... 379/144 |

FOREIGN PATENT DOCUMENTS

| | | | |
|---|---|---|---|
| EP | 0 360 732 | 3/1990 | ............ H04N/1/32 |
| EP | 0 374 012 | 6/1990 | ............ G07F/7/10 |
| EP | 0 423 035 | 4/1991 | ............ G07F/7/08 |
| EP | 0 459 781 | 12/1991 | ............ E05B/49/00 |
| EP | 0 609 143 | 8/1994 | ............ H04N/1/44 |
| EP | 0 695 076 | 1/1996 | ............ H04N/1/21 |
| FR | 2 701 181 | 8/1994 | ............ H04M/1/50 |
| GB | 2 274 523 | 7/1994 | ............ G06F/15/30 |
| JP | 63-211843 | 9/1988 | ............ H04L/11/26 |
| WO | WO 82 04169 | 11/1982 | .......... H04M/11/00 |
| WO | WO 88 03294 | 5/1988 | .......... G06K/19/00 |
| WO | WO 96 04741 A | 2/1996 | .......... H04M/1/100 |
| WO | WO 96 31971 | 10/1996 | .......... H04M/11/00 |
| WO | WO 97 03421 | 1/1997 | |
| WO | WO 97 12471 | 4/1997 | .......... H04M/1/274 |

OTHER PUBLICATIONS

"Calling card service—TSPS hardware, software and signalling implementation" Colfalone, D., et al. Bell System Technical Journal, vol. 61, No. 7, Pt. 3, pp. 1675–1714.

"Calling Card Service—overall Description and operational Characteristics" Basinger R., et al. Bell System Technical Journal, vol. 61, No. 7, Pt. 3, pp. 1655–1673.

* cited by examiner

METHOD AND SYSTEM FOR ENSURING THE SECURITY OF THE SUPPLY OF SERVICES OF TELECOMMUNICATION OPERATORS

The domain of this invention is remote services offered by telecommunications operators to their customers subscribing to their network.

More precisely, the invention relates to a method and a system enabling a telecommunications operator to quickly identify subscribers to a telephone network, and to reliably debit their accounts.

The problem that arises is to prevent a dishonest user from accessing the telecommunications network without being authorized to do so, without paying the corresponding costs, or from claiming that he did not request the services that were debited to him by the telecommunications operator.

To solve this problem it has been proposed to use access keys generated by memory cards and to modify telephone handsets so that they can read the memory cards. Apart from their costs, these solutions are not very practical and take a long time to set up. The problem that arises can only really be solved if a solution is known to another problem—how to design a method and system that is convenient to use and that can be quickly and economically installed. Ease of use and time savings are major problems for any product aimed at the general public, and cannot be ignored.

A proposal has been made (document WO 96 04741 in the name of Andrew MARK) to use a card emitting encrypted DTMF type acoustic signals. Thus, the holder of this card can couple it to the microphone in a telephone handset, to automatically transfer his identifiers to computer services. Since these identifiers are encrypted, a third party should not be in a position to understand the contents.

However, there is nothing to stop the signals emitted by the card from being recorded, and a defrauder in possession of this type of recording could substitute himself for the card holder.

Therefore, if A. MARK's solution were transposed to the case of telecommunications operators wishing to quickly and reliably identify subscribers to their networks, would not prevent a dishonest user from accessing the services offered by telecommunications operators, without authorization.

The objectives of this invention are achieved, and the problems that arise with techniques according to prior art are solved according to the invention by means of a method comprising the following steps:

the telecommunications operator provides each of its subscribers with a subscriber card, the same size as a credit card, customized by identifiers specific to each subscriber and to each subscriber card, the said card, the same size as a credit card, emits short acoustic DTMF type identification signals, at least partly encrypted and varying for each operation, when the subscriber uses it, acoustic identification signals are received by the microphone in the telephone handset and are converted into electrical signals before being transmitted through the communications network to the telecommunications operator's computer service, the transmitted signals and the customer and card identification data stored by the computer service are methoded and electronically compared by the telecommunications operator's computer service.

Thus with this method, the telecommunications operator can verify that the caller actually has an authentic card and not a computer artifice. He can also identify the card holder as being a person authorized to use the offered services. Consequently if the results are conform, the customer is immediately connected the voice server or the telecommunications operator's receptionist. Furthermore, defrauders cannot determine identification data since they were automatically transmitted in encrypted form. Furthermore, with the recorded acoustic signals in any form whatsoever, a defrauder will be unable to identify himself to the telecommunications operator and benefit from its services. The acoustic identification signals are different for each operation, in other words every time that the card is used.

Preferably the said card:

also counts the number of times $C(p,n)$ that it is used, emits acoustic signals representing the number of times $C(p,n)$ that it has been used, encrypts acoustic signals as a function of the number of times $C(p,n)$ that it has been used.

Also preferably, the said computer means for methoding and electronically comparing the transmitted signals and the customer and card identification data held by the telecommunications operator's computer service, store the number of times $C(p,m)$ that the card has been used at the time of the last validated operation, compare the number of times $C(p,n)$ that the card has been used at the time of the current operation, with the memorized number of times N1, refuse the current operation if $C(p,n)$ is less than or equal to $C(p,m)$ and continue verifying the current operation if $C(p,n)$ is greater than $C(p,m)$, recalculate electronic signals $S'(p,n)$ as a function of identification data and the number of times $C(p,n)$ that the card was used, during the current operation, and then compare them with the transmitted electronic signals $S(p,n)$. If the values agree, the subscriber may then immediately be connected to the telecommunications operator's services.

In order to increase security, in one variant embodiment, the method also comprises a step in which the subscriber uses a keypad associated with the telephone handset and/or the card to send a pin code. After transmission to the telecommunications operator's computer service through the communications network, this pin code is methoded and compared with the subscriber's pin code held by the telecommunications operator's computer service.

Thus the telecommunications operator can check that the caller is actually the person authorized to be connected to its services. A stolen card cannot be used by the thief, since he does not know the pin code.

In another variant embodiment also designed to increase security of the method and to make it impossible for the customer to dispute the order that he made to the telecommunications operator, the method also includes the following steps:

orders given by the subscriber to the telecommunications operator are validated by the subscriber by using the subscriber card so that it sends an encrypted acoustic validation signal, the telecommunications operator's computer service records the said validation signal.

Advantageously, the method according to the invention may include the following additional step:

an acknowledgment of the validation signal is sent to the customer.

With this method, the subscriber used an electronic signature to validate the order that he gave to the telecommunications operator.

The invention also relates to a system enabling subscribers to a telecommunications network to quickly and reliably access services offered by the telecommunications operator to his customers. This system is capable of understanding the means of implementing the method described above and its variant embodiments.

More particularly:

The system according to the invention comprises a subscriber card, the same size as a credit card, customized by specific identifiers for each subscriber card and for each subscriber, provided by the telecommunications operator. The said card comprises means of emitting short acoustic identification signals of the DTMF type. The subscriber controls the emission means using an element accessible from the outside of the subscriber card. The card also comprises encryption means in order to encrypt at least part of the acoustic signals, and to vary them whenever the card is used.

The system according to the invention comprises a telephone handset comprising a microphone used to receive acoustic signals, and to transform them into electrical signals that can be transmitted through the communications network.

The system according to the invention also comprises computer means dependent on the telecommunications operator's computer services connected to the telecommunications network. The said computer means comprise:
* a database containing the references of the subscriber cards and subscribers and their identification data,
* methoding means and means of comparing the transmitted electronic signals and identification data contained in the database. Thus with this system, the telecommunications operator can verify that the caller has actually an authentic card and not a computer artifice. He can also identify the card holder as a person authorized to use the services that he offers. Consequently if the card is conform, the customer will immediately be connected to the voice server or the telecommunications operator's receptionist. Furthermore, defrauders can no longer determine identification data since they were automatically transmitted in encrypted form. Furthermore, a defrauder will not be able to identify himself to the telecommunications operator's computer services using a recording of the acoustic signals in any form whatsoever, since the acoustic identification signals vary during each operation, in other words every time that the card is used.

Preferably, the card also includes:

an incremental counter interconnected to emission means and encryption means that is incremented by at least one unit every time that the card is used.

Consequently, the state of the incremental counter is sent to the computer means and acoustic signals are encrypted as a function of the state of the incremental counter. Preferably, the said computer means also comprise:

means of memorizing the state $C(p,m)$ of the incremental counter at the time of the last validated operation.

means for comparing the state $C(p,n)$ of the incremental counter emitted during the current operation with the state $C(p,m)$ of the memorized incremental counter.

Consequently, the check on the current operation is refused if $C(p,n)$ is less than or equal to $C(p,m)$ and is accepted if $C(p,n)$ is greater than $C(p,m)$.

Also preferably, the said methoding means and the said means of comparison of the electronic signals and identification data contained in the database include means of recalculating the electronic signals as a function of the state $C(p,n)$ of the incremental counter and the identification data, and then comparing them with the transmitted electronic signals. Consequently if agreement is found, the subscriber can immediately start communications with his correspondent or with the telecommunications operator's services.

In one variant embodiment designed to increase the security of the system, the system also comprises second means of comparing a subscriber's pin code stored in the database, with a pin code input by the subscriber. This code is emitted by means of a keypad associated with the telephone handset and/or the card, and is transmitted to the telecommunications operator's computer means, through the communications network.

Thus, the telecommunications operator can verify that the caller is actually the person authorized to access the services. A thief cannot use a stolen card because he does not known the pin code.

In another variant embodiment, also designed to increase the security of the system and to make it impossible for the customer to dispute an order that he gave to the telecommunications operator, the system according to the invention is such that:

when the subscriber activates the said card, it emits an encrypted acoustic signal to validate orders given by the subscriber, the said computer means include means of detecting and recording the validation signal.

With this system, the customer validated the order that he made to the telecommunications operator with an electronic signature.

Advantageously, in this case the computer means also include means of printing an acknowledgment of orders made. This acknowledgment is addressed to the subscriber.

Figure 2:
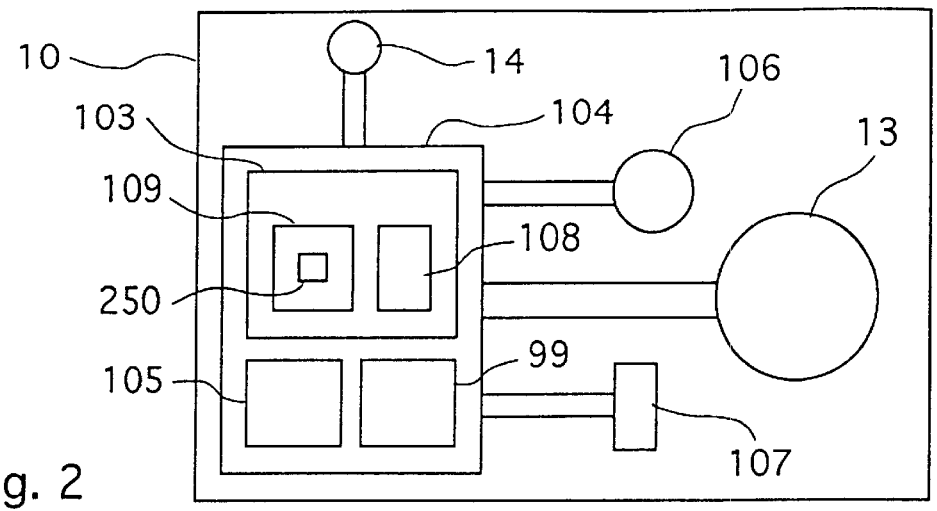
Figure 3:
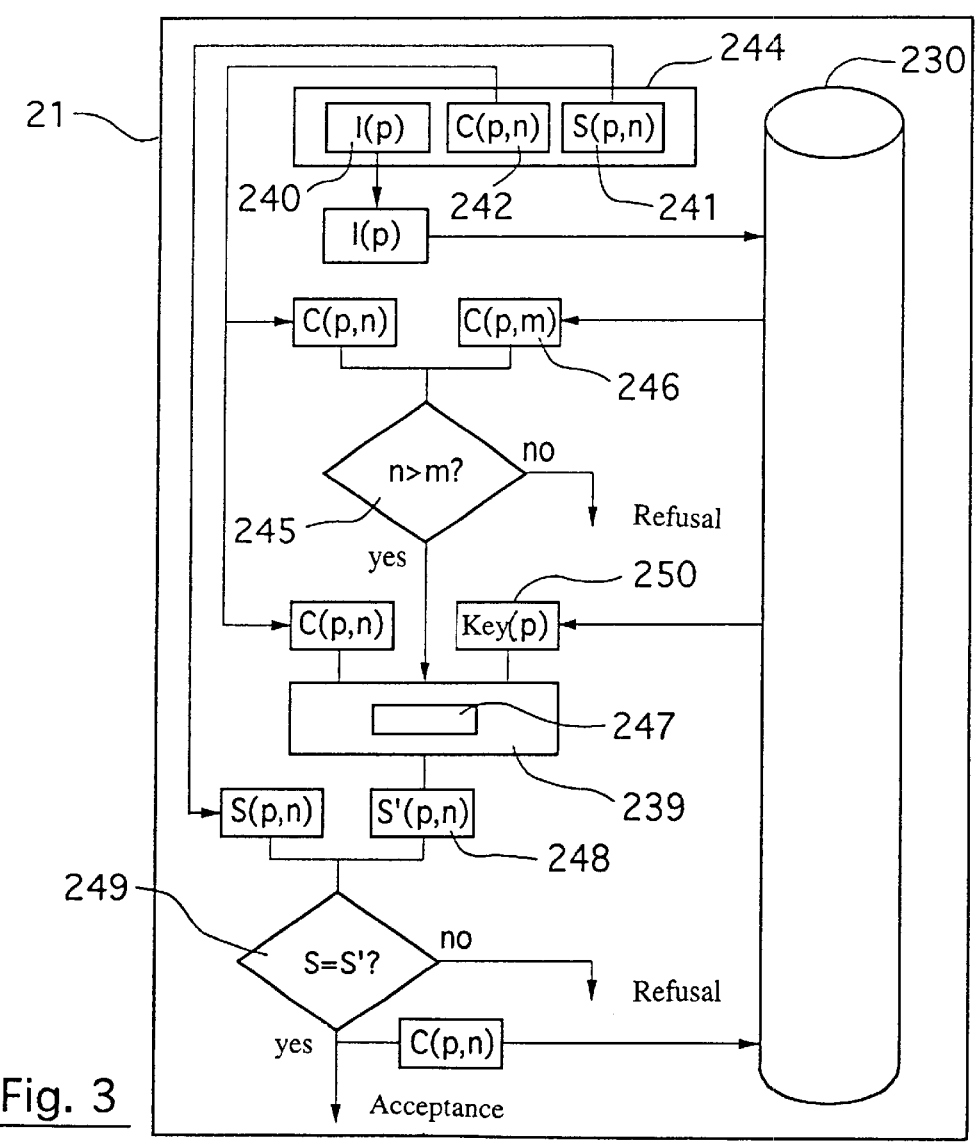

Other characteristics and advantages of the invention will become clear by reading the description of variant embodiments of the invention given for guidance and in no way restrictive, and:

FIG. 1 showing a perspective diagrammatic view of the system and method according to the invention, FIG. 2 showing the card in the form of a block diagram, FIG. 3 showing the algorithm used to verify the authenticity of the transmitted signal.

The system and method according to the invention enable the customer (11) (otherwise referred to as the subscriber) to call services 30 provided by the telecommunications operator (the receptionist) 12 to his customers 11, reliably and quickly, particularly from a public telephone booth 31, using a telephone handset 16 comprising a microphone 17. The telephone handset 16, remote from the telecommunications operator's computer services 18 is connected to the computer services 18 through a communications network 15. The system comprises a card 10, the same size as a credit card, customized by specific identifiers for each card and for each customer 11. This card is provided to subscribers of the telecommunications operator 12.

The card 10 comprises emission means, particularly a loudspeaker 13 emitting short DTMF type acoustic identification signals 20. These signals are emitted when the customer uses a button 14 accessible from the outside of the card (not shown in FIG. 1 since it is on the other side of the card) to activate emission means 13 and the devices controlling them. These emission means 13 are excited by a DTMF signal generator 99 controlled by a micromethodor 104 powered by a battery 106 and controlled by a resonator 107. The micromethodor 104 contained in the card comprises encryption means 103 used to at least partly encrypt the acoustic signals 20, comprising an encryption algorithm 108 and specific identifiers 109 for each card 10 and for each customer 11, and particularly the secret key 250 used by the encryption algorithm 108.

The acoustic signals 20 are received by the microphone 17 on the telephone handset, against which the customer presses card 10. The system also comprises transmission means 19 for sending acoustic signals 20 located in the telephone handset 16. These transmission means 19 send acoustic signals to the remote site after methoding, and conversion into electronic signals through the communications network 15. The system also comprises computer means 21 dependent on the telecommunications operator's computer services 18. These computer means are connected to the communications network 15 and are remote from the telephone handsets 16.

These computer means 21 themselves comprise:
a database 23 containing the references of the cards and customers and their identification data;
methoding means 24 and comparison means 25 for comparing electronic signals and identification data contained in the database.

Consequently, if the request is conform, the telecommunications operator's services 30 are immediately accessible to the customer 11.

Preferably, the micromethodor 104 and the encryption means 103 are designed such that the acoustic signal 20 varies with each operation. Encrypting an identification code means transforming it into a series of items of information which are incomprehensible individually and can only be decrypted by the person holding the encryption key. But this can in no way prevents a copy being made of the encrypted identification code either during its acoustic transmission (recorder) or by the pirating from telephone line. If this copy is improperly used by a defrauder, the receiving system will treat it as having all the characteristics of the original, and it will then be interpreted in order to verify the identifiers of the card.

Therefore the problem that arises is how can any reproduction attempt be made impossible? The following describes several variant embodiments to the general means that is used to make a distinction between the original and the copy when analyzing the encrypted signal received by the computer means 21, by inserting a distinctive element in the DTMF type signal 20 emitted by the card 10.

One of the variants consists of using a "time-dating" function (for example as described in U.S. Pat. No. 4 998 279). This time-dating function uses the "time" parameter that changes continuously. Thus the "copy" is delayed when it is emitted. This type of solution requires that the emission means 13 and the computer means 21 are synchronized. In order to do this, both must have a "time base" and "frequency standard". These two time bases have their own precision and their own drift. The result is that they slowly but gradually become desynchronized. In order to overcome this technical difficulty, a certain amount of drift is tolerated between the time bases of the emission means 13 and the computer means 21. As this drift increases, the uncertainty about the "validity" of the information received and the risk of fraud also increases. Thus, if a drift of one minute is tolerated, the analysis system in the computer means 21 will consider that an illegal copy of the encrypted signal emission is valid if it is reused fraudulently within the next 30 seconds.

Another variant consists of using incremental lists (for example as described in U.S. Pat. No. 4 928 098). The emission device and the reception device have an ordered list of the successive encryptions of the identification code, or have algorithms that can be used to prepare them as time goes on. At a given instant, computer means 21 are waiting for the encrypted result C(n). If they actually receive the message C(n), it validates the operation. But the computer means 21 may receive a different message, the card user may have activated the card's emission means 13 several times, possibly by playing with it or perhaps accidentally, so that the card is in the situation that it emits the encrypted result C(n+p) the next time that it is used with the computer means 21. If the computer means 21 receive a different message, they will search forwards in the list of successive encrypted results to see if there was a message C(n+p) identical to the received message. One way of removing the ambiguity between "is this an authentic message emitted by the emitter?" or "is it a fraudulent message?" is to request the next emission, or wait for it. If the next emission is identical to C(n+p+1), the system validates the message and puts itself in waiting for the next emission in state C(n+p+2). If it is different, the message is not validated and the analysis system remains in waiting for message C(n). This variant embodiment is not very ergonomic since it obliges the card holder to activate the card several times.

According to one preferred variant embodiment for distinguishing the original signal from its copy, the onboard micromethodor 104 in card 10 comprises an incremental counter 105. The incremental counter 105 is incremented by one or several units each time the card is used. Obviously, like a ratchet, it cannot go backwards, and simply move forwards every time it is used.

In the case of this variant embodiment, the state C(p,n) 242 of the counter 105 is used in the calculation of the encrypted message 244 sent by emission means 13. The algorithm 108 (for which the equivalent algorithm 247 is memorized in the computer means 21) calculates the encoded part S(p,n) 241, using the secret key 250 specific to each card and the state C(p,n) 242 of the counter 105. In addition to the identification number I(p) 240 of the card and the encrypted identification code S(p,n) 241, the card 10 emits the state C(p,n) 242 of its incremental counter 105 during each emission. The computer means 21 memorize 230 the state C(p,n) 242 of the incremental counter 105 during the last validated operation, in the database 23. Thus each time a message 244 is received, the comparison means 25 in the computer means 21 can compare 245 the information received about the state C(p,n) 242 of the counter 105, with the previous information received C(p,m) 246 stored in memory 230, 23.

a) If the state C(p,n) 242 of the counter 105 (FIG. 2) expressed in message 244 is greater than the previously received state C(p,m) 246 (n>m), then the message 244 is accepted and the analysis continues.

b) If the state C(p,n) 242 of the counter 105 expressed in message 244 is less than or equal to the previously received state C(p,n) 246 (n£ m), then the message will be refused. The received message can only be a copy made previously or a computer artifice.

If the conditions described in item a) above are satisfied, the computer means 21 can be used to read the fixed part I(p) 240 and to search for the corresponding secret key for the card in their own database 23, 230. The calculation means 239 in the methoding means 24 may then calculate the encrypted code expected by the computer means 21, using the algorithm 247, the state of the counter C(p,n) 242 and the secret key (p) 250. The comparison means 25 then compare the encrypted code S'(p,n) 248 thus calculated 249 with the encrypted code actually received S(p,n) 241. Therefore this method and these means can validate or invalidate message 244, without the need for the card user to activate the card several times as is the case in the variant embodiment described above.

The existence of an incremental counter 105 in card 10 can define the maximum number of times that the card can be used when the card is being individually programmed, at no additional cost. Once this maximum has been reached, the card will no longer emit a consistent message and is therefore refused by the computer means 21.

The emitted frame 244 contains the following for a given card (p), a fixed part I(p) 240 (the card identification number),
a variable incremental part C(p,n) 242 (the state of the counter),
a variable part S(p,n) 241 which is apparently random (the result of an encryption algorithm 108 on the secret key 250 specific to this card (p)).

The frame emitted:
is always different on each different card,
for the same card, is always different on each emission.

For a given card (p), the computer means 21 can:
read the fixed part I(p) 240 (the card identification number),
search in their own database 23 for the secret key 250 of this card and the last record received of the state C(p,m) 246 of the counter 105 on this card,
refuse this frame 244 if the state of the counter C(p,n) 242 for the current operation is less than or equal to the previously received state C(p,m) 246, and continue the verification of the current operation if the state C(p,n) 242 is greater than the previously received state C(p,m) 246,
decrypt the received message 244 and validate its contents, by recalculating the specific key 250 for this card using the encryption algorithm 247 and the state of the counter C(p,n) 242 and then comparing the result of the calculation with the received message.

Thus using this combination of means, it is possible to emit DTMF type acoustic identification frequencies using a card the same size as a credit card, the frequencies being received by the microphone in equipment connected to the telephone network and being certain of the authenticity of the calling card and thus eliminate the possibility of any defrauder using a sound or computer record or a computer artifice.

In order to increase the security of the system in the variant embodiment shown in FIG. 1, the computer means 21 also comprise second comparison means 26. These comparison means are used to compare a pin code for the subscriber contained in the database with the pin code emitted by the user. This code is emitted using a keypad 27 associated with the handset 16 and/or the card 10 and transmitted to the computer means 21 belonging to the telecommunications operator through the communications network 15.

Thus, the telecommunications operator is assured that the caller 11 is actually the person authorized to be connected to its services. A thief cannot use a stolen card because he does not known the pin code.

In another variant embodiment, also designed to increase the security of the system and to prevent the customer from disputing the order that he gave to the telecommunications operator, the system according to the invention is such that:

when the card 10 is activated 14 by the subscriber, it emits an encrypted acoustic signal validating the orders given by the subscriber 11, the said computer means 21 comprise means of detecting 21a and recording 21b the validation signal.

With this system, the customer enters an electronic signature to validate the order that he gave to the telecommunications operator.

Advantageously in this case, the computer means 21 also comprise means 28 of printing an acknowledgment 29 of the given orders. This acknowledgment is addressed to the subscriber 11.

What is claimed is:

1. A method enabling a telecommunications operator to quickly identify and reliably debit subscribers to a telephone network, the method comprising:

the telecommunications operator provides each subscriber with a subscriber card, the same size as a credit card, customized by identifiers specific to each subscriber and to each subscriber card;

said card:
counts the number of times C(p,n) the subscriber uses the card by pressing a button;
a emits acoustic identification signals varying each time that said card has been used and representing the number of times C(p,n) that said card has been used; and
at least partly encrypts acoustic signals as a function of the number of times C(p,n) that said card has been used;

acoustic identification signals are received by a microphone in a telephone handset and are converted into electrical signals before being transmitted through a communications network to a computer service of the telecommunications operator, said computer service comprising a computer means;

the transmitted signals and the subscriber and subscriber card identification data stored by the computer service of the telecommunications operator are methoded and electronically compared by said computer means of said telecommunications operator's computer service;

said computer means for methoding and electronically comparing the transmitted signals and the subscriber and card identification data held by the computer service of the telecommunications operator:
stores the number of times C(p,m) that the card has been used at the time of the last validated operation;
compares the number of times C(p,n) that the card has been used at the time of the current operation, with the memorized number of times C(p,m);
refuses the current operation if C(p,n) is less than or equal to C(p,m) and continues verifying the current operation if C(p,n) is greater than C(p,m); and
recalculates the electronic signals S'(p,n) as a function of identification data and the number of times C(p,n) that the card was used, during the current operation, and then compares them with the transmitted electronic signals S(p,n), so that if the values agree, the subscriber may then immediately be connected to the services of the telecommunications operator.

2. The method according to claim 1, further comprising the following step:
the subscriber uses a keypad associated with the microphone and/or the card to send a pin code; after transmission to the telecommunications operator's computer service through the communications network, the pin code is methoded and compared with the customer's pin code held by the telecommunications operator's computer service.

3. The method according to claim 1, further comprising the following steps:
  orders given by the subscriber to the telecommunications operator are validated by the subscriber by activating the subscriber card so that it emits an encrypted acoustic validation signal; and
  the telecommunications operator's computer service records said validation signal.

4. The method according to claim 3, further comprising the following step:
  an acknowledgment of the validation signal is addressed to the customer.

5. A system by which a telecommunications operator can quickly identify and reliably debit subscribers to a telephone network, said system comprising:
  a subscriber card, the same size as a credit card, customized by identifiers different for each subscriber card and for each subscriber, and provided to subscribers;
  said card comprising:
    an incremental counter that is incremented by at least one unit every time that the card is activated by the subscriber using an element accessible from the outside of the subscriber card;
    encryption means and emission means, interconnected to said incremental counter, emitting the state of the incremental counter and varying and at least partly encrypting acoustic identification signals, every time that the card is activated by element, such that the acoustic identification signals are encrypted as a function of the state of the incremental counter;
  said system further comprising:
  a telephone handset comprising a microphone that will receive the acoustic signals and transform them into electronic signals that can be transmitted to a remote site of a computer service of the telecommunications operator through a communications network;
  said computer service comprising computer means connected to the telecommunications network;
  said computer means comprising:
    a database containing the references of subscriber cards and subscribers and their identification data;
    means of memorizing the state C(p,m) of the incremental counter at the time of the last validated operation;
    means for comparing the state C(p,n) of the incremental counter emitted during the current operation with the state C(p,m) of the memorized incremental counter, such that the check on the current operation is refused if C(p,n) is less than or equal to C(p,m) and is accepted if C(p,n) is greater than C(p,m); and
    means of recalculating the electronic signals S'(p,n) as a function of the state C(p,n) of the incremental counter and the identification data contained in the data base, and then comparing them with the transmitted electronic signals S(p,n), such that if agreement is found, the subscriber can immediately be connected with the services of the telecommunications operator.

6. The system according to claim 5, said computer means also comprising:
  second means of comparison to compare a subscriber pin code contained in the database with a pin code emitted by the customer using a keypad associated with the telephone handset and/or the card and transmitted to the telecommunications operator's computer means through the communications network.

7. The system according to claim 5, said card also emitting an encrypted acoustic signal validating the orders given by the subscriber, when activated by the subscriber, said computer means also comprising:
  means of detecting and recording the validation signal.

8. The system according to claim 7, said computer means also comprising:
  means of printing an acknowledgment of the orders given, which will be addressed to the subscriber.

* * * * *